Aug. 22, 1933.   W. H. VICKERS   1,923,244
TOY CIRCUS
Filed Jan. 13, 1933   5 Sheets-Sheet 1
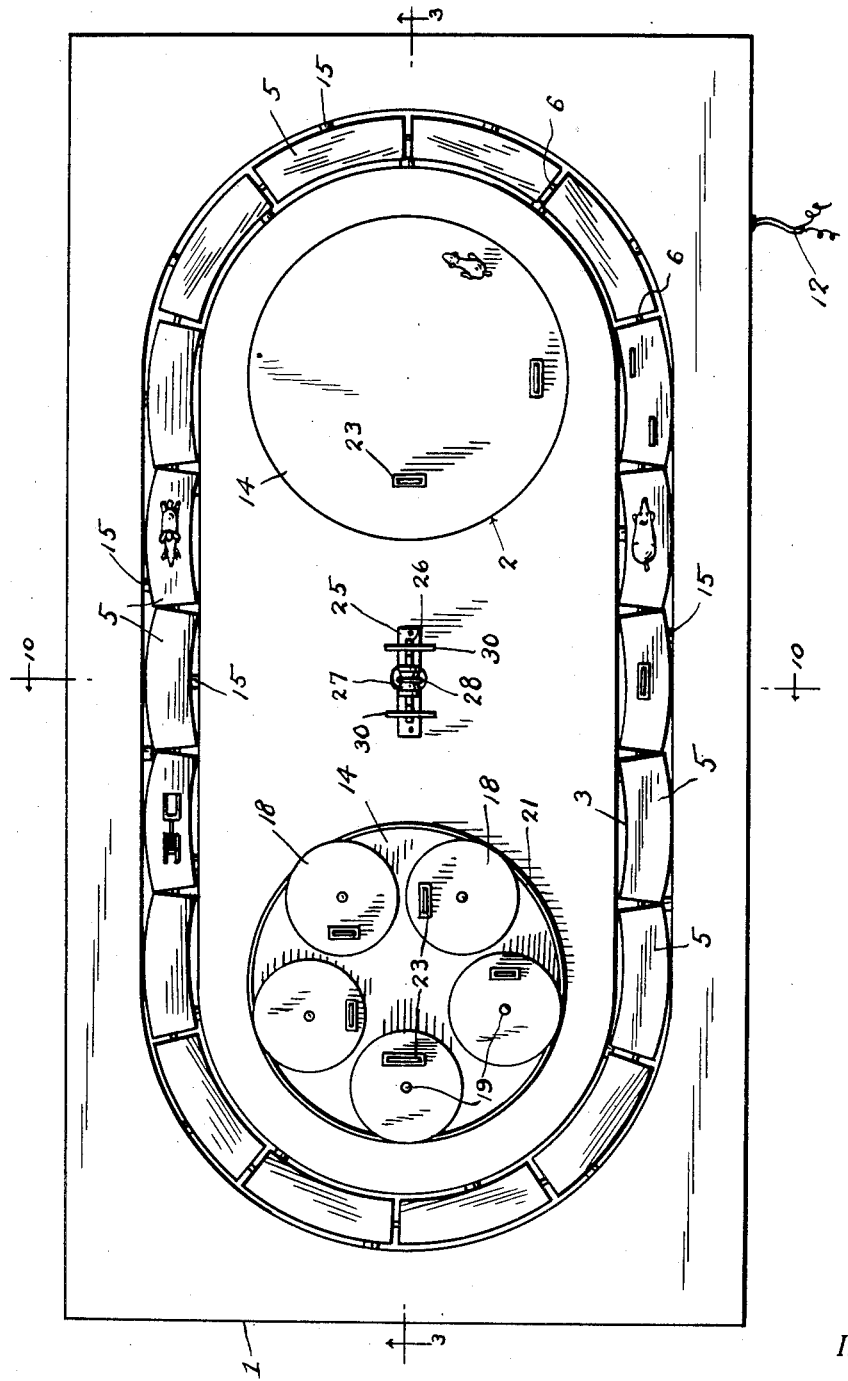
Inventor
William H. Vickers
By Clarence A. O'Brien
Attorney Aug. 22, 1933.　　W. H. VICKERS　　1,923,244
TOY CIRCUS
Filed Jan. 13, 1933　　5 Sheets-Sheet 2
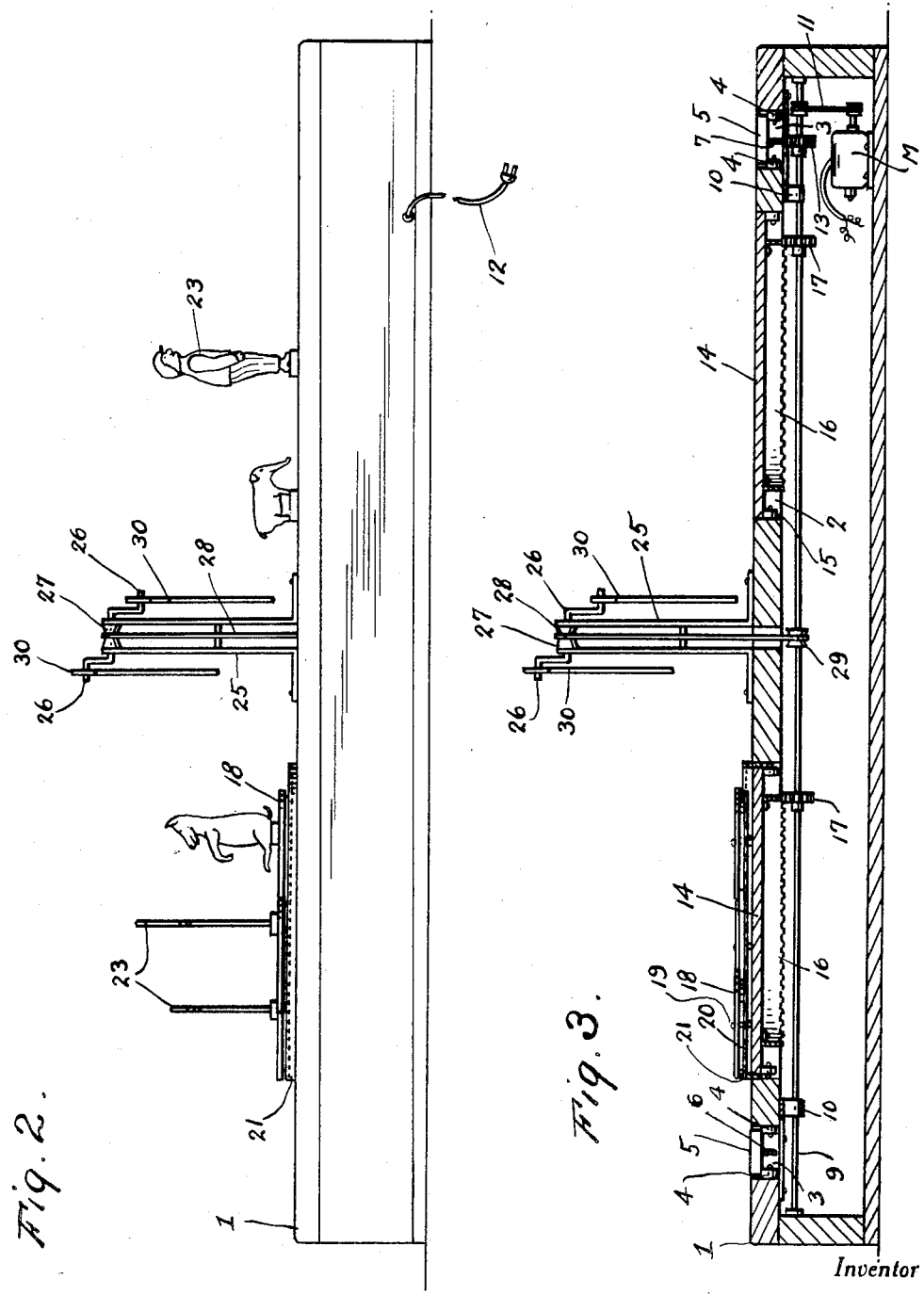
Inventor
William H. Vickers
By Clarence A. O'Brien
Attorney Inventor
William H. Vickers Aug. 22, 1933.   W. H. VICKERS   1,923,244
TOY CIRCUS
Filed Jan. 13, 1933    5 Sheets-Sheet 4
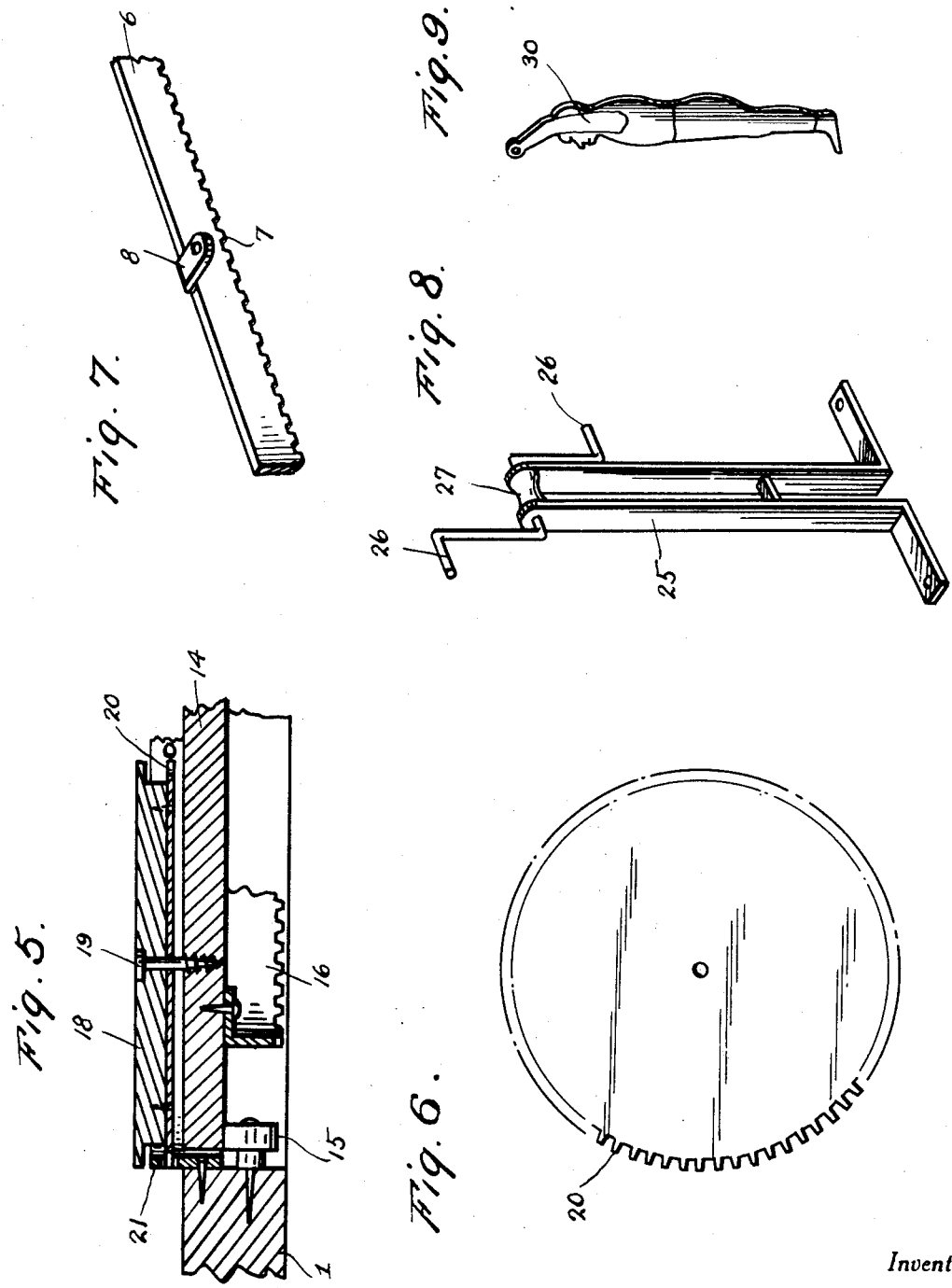
Inventor
William H. Vickers
By Clarence A. O'Brien
Attorney Aug. 22, 1933.  W. H. VICKERS  1,923,244
TOY CIRCUS
Filed Jan. 13, 1933  5 Sheets-Sheet 5
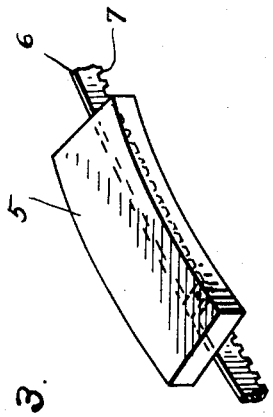
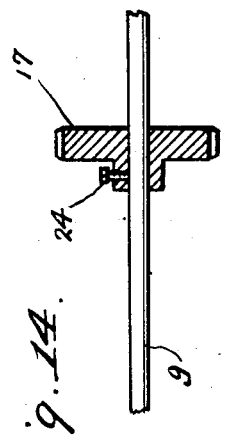
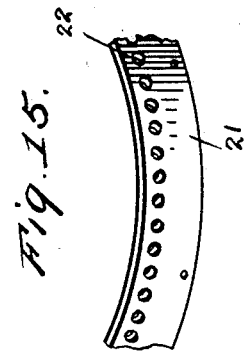
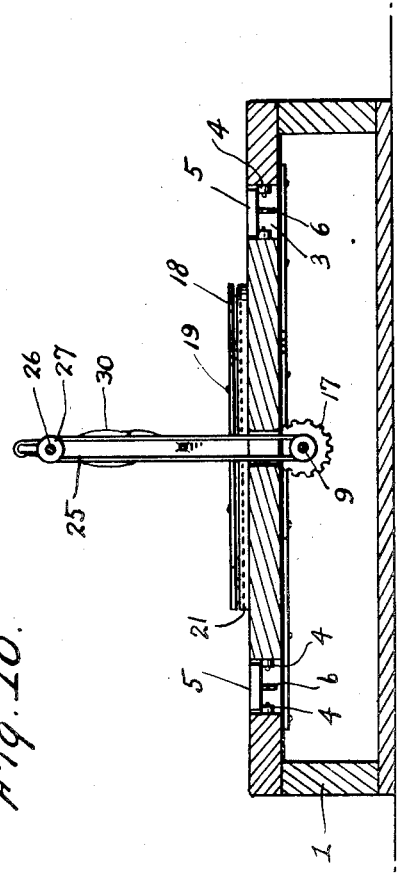
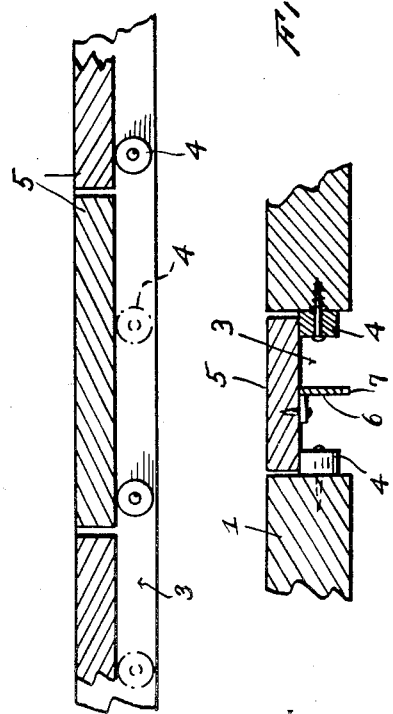
Inventor
William H. Vickers
By Clarence A. O'Brien
Attorney Patented Aug. 22, 1933

1,923,244

UNITED STATES PATENT OFFICE 1,923,244

TOY CIRCUS

William Howard Vickers, Liberal, Kans.

Application January 13, 1933. Serial No. 651,578

2 Claims. (Cl. 46—37)

This invention relates to a toy circus, the general object of the invention being to provide endless and rotary members, with means for actuating such members and said members having representations of men, animals or the like thereon so that as the members move the figures thereon will simulate circus performers.

Another object of the invention is to provide small circular members on one of the larger members and means for rotating said smaller members as the large member rotates and means for holding figures on said smaller members.

A further object of the invention is to provide an upright having a crank shaft at its upper end, means for rotating the crank with the figures supported by the cranks so that said figures, when the crank shaft is rotated, will simulate acrobats.

This invention also consists in certain other features of construction and in the combination and arrangement of the several parts to be hereinafter fully described, illustrated in the accompanying drawings and specifically pointed out in the appended claims.

In describing the invention in detail reference will be had to the accompanying drawings wherein like characters denote like or corresponding parts throughout the several views, and in which:

Figure 1 is a top plan view of the invention.

Figure 2 is a side view thereof.

Figure 3 is a section on line 3—3 of Figure 1.

Figure 5 is a fragmentary vertical sectional view through a part of the base and a part of the rotary member showing the means for supporting a smaller member on the rotary member and for rotating said smaller member.

Figure 6 is a view of the sprocket connected to said smaller member.

Figure 7 is a fragmentary view of the flexible endless member having teeth at its lower edge.

Figure 8 is a view of one of the figures representing an acrobat.

Figure 9 is a perspective view of the upright supporting the crank shaft.

Figure 10 is a section on line 10—10 of Figure 1.

Figure 11 is a section on line 11—11 of Figure 4.

Figure 12 is a section on line 12—12 of Figure 4.

Figure 13 is a fragmentary view of the endless flexible member and showing one of the blocks attached thereto.

Figure 14 is a view showing how the gear can be adjustably arranged on the drive shaft.

Figure 15 is a fragmentary view of the perforated band for rotating the smaller rotary member.

Figure 4:
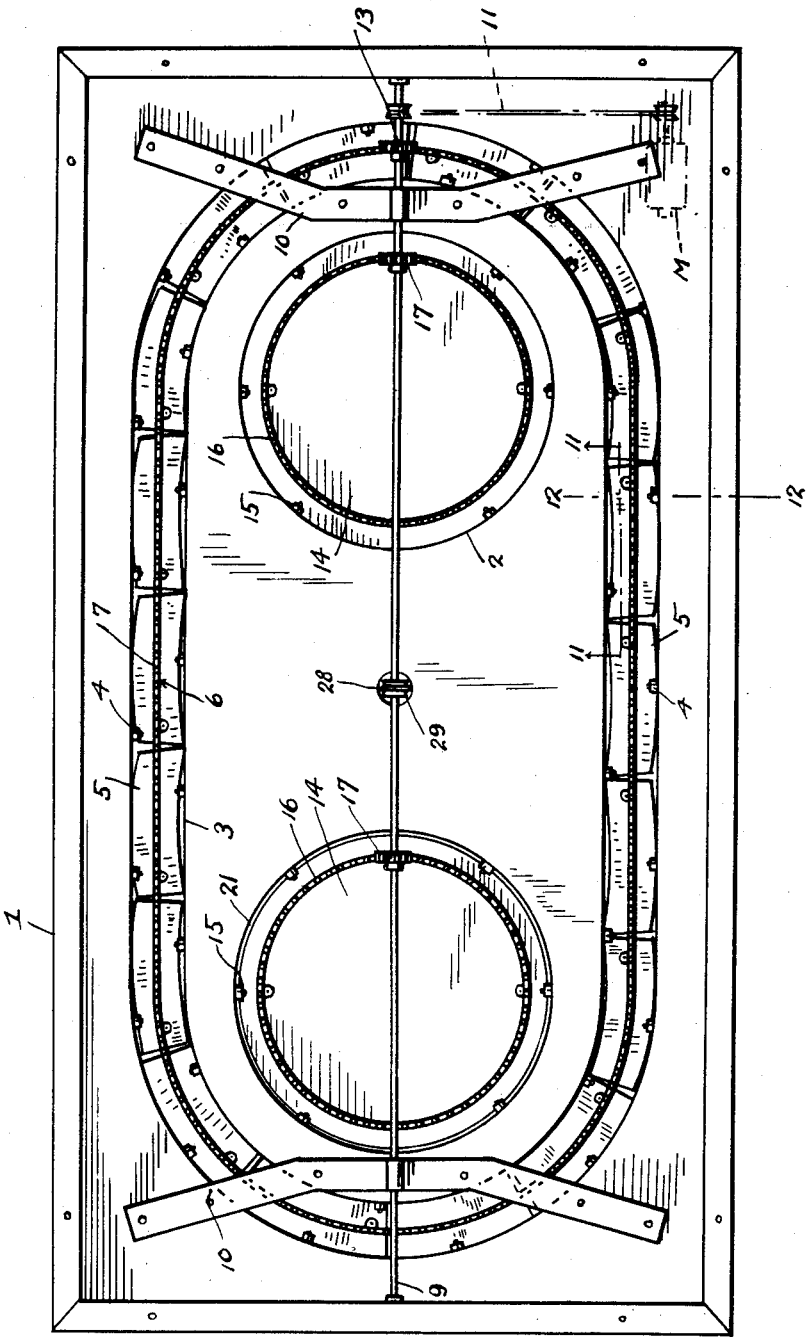
Figure 4 is a bottom plan view with the bottom of the casing removed.

In these views numeral 1 indicates a casing forming the base of the device which has its bottom closed and at its top formed with a number of circular openings 2 and an endless slot 3 which has straight side portions and rounded ends as shown. Rollers 4 are rotatably supported on the walls of the slot for movably supporting the elongated, slightly arcuate blocks 5. A flexible band 6 has teeth 7 at its lower end and lugs 8 are arranged in spaced relation at its upper edge and the front part of each block is fastened to one of these lugs so that the block has turning movement on the lug and can thus pass along the straight side portions of the slot as well as around the rounded ends thereof as shown in Figure 4. A longitudinally extending shaft 9 is supported by the brackets 10 depending from the top of the casing and this shaft can be rotated in any suitable manner such as by means of the electric motor M which is connected with the shaft as shown generally at 11, the conductor of the motor being shown at 12. This shaft has a gear 13 fastened thereto for engaging the teeth 7 of the band 6 so that this endless band with the block attached thereto will be driven from the shaft so that the blocks will move around the endless track.

A disk 14 is rotatably arranged in each opening 2 and is supported by the rollers 15 supported from the walls of the opening and an annular rack 16 depends from the bottom of each disk and is engaged by a gear 17 fastened to the shaft. A number of small disks 18 are rotatably mounted on one of the disks 14, such as by the screws 19, and a sprocket disk 20 is fastened to the under face of each small disk 18. A band 21 is fastened to the upper portion of the wall of an opening 2 and has a part extending above the top of the disk and this top is provided with the spaced holes 22 to be engaged by the teeth of the sprocket 20.

Thus as the disk 14 is rotated from the drive shaft the small disks 18 are also rotated in an opposite direction from the direction of rotation of the disk 14 by means of the sprockets 20 engaging the holes 22 in band 21. Figures of animals, human beings or the like can be placed on the blocks 15, on the disks 14 and on the disks 18 and when desired holders 23 can be placed on the parts for holding the figures as shown in Figure 2.

The gears can also be adjustably arranged on the shaft by being attached to the shaft by the set screws 24 so that they can be moved to rotate the parts in different directions.

An upright member 25 is fastened to the top of the casing and carries a crank shaft 26 at its upper end to which the pulley 27 is attached. A cable 28 passes over this pulley through a hole in the top of the casing and over a pulley 29 on the drive shaft so that the crank shaft is driven from the drive shaft. Figures, such as that shown at 30 in Figure 9 may be attached to the cranks of the crank shaft so that they will be actuated when the same is rotating to simulate a circus acrobat.

Thus it will be seen that I have provided a toy circus the parts of which are all driven from the drive shaft and which will be very amusing to children when in operation. The rotating disks and the movable blocks simulate the rings and performing platforms in a real circus.

It is thought from the foregoing description that the advantages and novel features of the invention will be readily apparent.

It is to be understood that changes may be made in the construction and in the combination and arrangement of the several parts provided that such changes fall within the scope of the appended claims.

Having thus described my invention, what I claim as new is:

1. In a toy circus, a base having an endless slot therein, said slot having straight parallel side portions and rounded ends, rollers supported on the side walls of said slot, a plurality of elongated blocks fitting in the slot and engaging the rollers, the blocks having arcuate side walls, the inner walls being concaved and the outer walls convex, a vertically arranged endless metallic band to the upper edge of which the blocks are pivotally connected adjacent their front ends, the lower edge of the band having teeth formed therein, a shaft rotatably supported in the base, means for rotating the shaft and a pinion carried by the shaft and engaging the toothed lower edge of the band.

2. In a toy circus, a base having a circular opening therein, rollers supported on the walls of said opening, a disk fitting in the upper portion of the opening and resting upon the rollers, means for rotating said disk, a circular band fastened to the upper portion of the wall of the opening and projecting above the base and having an annular row of holes in its upper portion, a plurality of small disks rotatably supported on the first mentioned disk, a plate attached to the bottom of the small disk and having teeth in its circumference for engaging the holes in the band, each small disk having a circumferentially arranged flange at its upper part, portions of which extend over the band and the toothed portions of the plate, and means for rotating the first mentioned disk.

WILLIAM HOWARD VICKERS.